US007394347B2

(12) United States Patent
Kady

(10) Patent No.: US 7,394,347 B2
(45) Date of Patent: Jul. 1, 2008

(54) LOCKING DEVICE FOR ELECTRONIC EQUIPMENT

(75) Inventor: Darren Kady, Glen Allen, VA (US)

(73) Assignee: World Wide Innovations, LLC, Cornelius, NC (US)

(*) Notice: Subject to any disclaimer, the term of this patent is extended or adjusted under 35 U.S.C. 154(b) by 475 days.

(21) Appl. No.: 10/339,711

(22) Filed: Jan. 9, 2003

(65) Prior Publication Data

US 2003/0107470 A1 Jun. 12, 2003

Related U.S. Application Data

(63) Continuation-in-part of application No. 10/273,819, filed on Oct. 18, 2002, now abandoned, which is a continuation of application No. 09/178,837, filed on Oct. 26, 1998, now Pat. No. 6,469,615.

(60) Provisional application No. 60/065,941, filed on Oct. 27, 1997.

(51) Int. Cl.
*G05B 19/00* (2006.01)

(52) U.S. Cl. .................... 340/5.54; 340/5.51; 340/5.52; 340/5.1; 340/5.2; 340/5.85; 340/542; 340/5.8; 340/5.81

(58) Field of Classification Search .................. 340/5.1, 340/5.2, 5.51, 140, 542, 5.54, 5.52, 5.85, 340/5.8, 5.81; 380/229, 232
See application file for complete search history.

(56) References Cited

U.S. PATENT DOCUMENTS

| | | | | |
|---|---|---|---|---|
| 4,081,754 | A | 3/1978 | Jackson | |
| 4,263,781 | A | 4/1981 | Harner et al. | |
| 4,279,012 | A | 7/1981 | Beckedorft et al. | |
| 4,370,721 | A | 1/1983 | Berenberg et al. | |
| 4,484,220 | A | 11/1984 | Beetner | |
| 4,574,752 | A | 3/1986 | Reichert et al. | |
| 4,700,296 | A | 10/1987 | Palmer et al. | |
| 4,769,765 | A | 9/1988 | Green | |
| 4,959,860 | A * | 9/1990 | Watters et al. | 713/202 |
| 4,967,305 | A | 10/1990 | Murrer et al. | |
| 5,036,314 | A | 7/1991 | Barillari et al. | |
| 5,051,837 | A | 9/1991 | McJunkin | |
| 5,150,298 | A | 9/1992 | Fujioka et al. | |
| 5,191,231 | A | 3/1993 | Berry | |

(Continued)

FOREIGN PATENT DOCUMENTS

| | | | |
|---|---|---|---|
| DE | 0630802 | A2 | 5/1994 |

(Continued)

*Primary Examiner*—Brian Zimmerman
*Assistant Examiner*—Vernal Brown
(74) *Attorney, Agent, or Firm*—Sheldon H. Parker

(57) ABSTRACT

The operating control system can be use on electronic equipment, such as cell phones, computers, engine analyzers, etc. An input device enables the input of user access data and a readout panel monitors the equipment status. A programmable feature selection member enables the user to select at least one programmable feature and respective activation time period. An internal member controls operation of the equipment by controlling access to one or more said programmable features based upon user selection, to enable full or partial activation of the device. A user is able to program specific events, such as TV shows, to be activated at specific times with controlled access by secondary access codes.

28 Claims, 11 Drawing Sheets

U.S. PATENT DOCUMENTS

| | | | | | |
|---|---|---|---|---|---|
| 5,231,310 | A | * | 7/1993 | Oh | 307/142 |
| 5,231,661 | A | * | 7/1993 | Harnum et al. | 725/29 |
| 5,253,066 | A | | 10/1993 | Vogel | |
| 5,278,538 | A | | 1/1994 | Ainsworth et al. | |
| 5,291,067 | A | | 3/1994 | Nakajima et al. | |
| 5,331,353 | A | | 7/1994 | Levenson et al. | |
| 5,377,317 | A | | 12/1994 | Bates et al. | |
| 5,382,983 | A | | 1/1995 | Kwoh et al. | |
| 5,510,780 | A | | 4/1996 | Norris et al. | |
| 5,523,796 | A | | 6/1996 | Marshall et al. | |
| 5,524,195 | A | | 6/1996 | Clanton et al. | |
| 5,526,034 | A | | 6/1996 | Hoarty et al. | |
| 5,530,230 | A | | 6/1996 | Smith et al. | |
| 5,531,467 | A | | 7/1996 | Schueman | |
| 5,534,911 | A | | 7/1996 | Levitan | |
| 5,563,586 | A | | 10/1996 | Baum et al. | |
| 5,589,892 | A | | 12/1996 | Knee et al. | |
| 5,600,364 | A | | 2/1997 | Hendricks et al. | |
| 5,642,805 | A | | 7/1997 | Tefft | |
| 5,653,135 | A | | 8/1997 | Miller et al. | |
| 5,684,861 | A | | 11/1997 | Lewis et al. | |
| 5,805,763 | A | | 9/1998 | Lawler et al. | |
| 5,819,156 | A | | 10/1998 | Belmont | |
| 5,850,218 | A | | 12/1998 | LaJoie et al. | |
| 5,898,778 | A | * | 4/1999 | Antonini | 705/56 |
| 5,917,256 | A | | 6/1999 | Broadbent, II | |
| 5,930,446 | A | | 7/1999 | Kanda | |
| 5,940,755 | A | | 8/1999 | Scott | |
| 5,969,748 | A | | 10/1999 | Casement et al. | |
| 5,974,364 | A | | 10/1999 | Kim | |
| 5,982,355 | A | | 11/1999 | Jaeger et al. | |
| 6,005,489 | A | | 12/1999 | Siegle et al. | |
| 6,014,184 | A | | 1/2000 | Knee et al. | |
| 6,098,878 | A | | 8/2000 | Dent et al. | |
| 6,111,240 | A | * | 8/2000 | Kishimoto et al. | 219/720 |
| 6,144,401 | A | | 11/2000 | Casement et al. | |
| 6,202,014 | B1 | * | 3/2001 | Brandt et al. | 701/50 |
| 6,223,265 | B1 | | 4/2001 | Kawasaki et al. | |
| 6,226,793 | B1 | | 5/2001 | Kwoh | |
| 6,321,381 | B1 | | 11/2001 | Yuen et al. | |
| 6,430,488 | B1 | | 8/2002 | Goldman | |
| 6,433,818 | B1 | * | 8/2002 | Steinberg et al. | 348/161 |
| 6,442,406 | B1 | | 8/2002 | Harris et al. | |
| 6,463,276 | B1 | * | 10/2002 | Jonsson | 455/410 |
| 6,473,559 | B1 | | 10/2002 | Knudson et al. | |
| 6,501,380 | B1 | * | 12/2002 | Jakobsson | 340/571 |
| 6,505,348 | B1 | | 1/2003 | Knowles et al. | |
| 6,536,041 | B1 | | 3/2003 | Knudson et al. | |
| 6,614,987 | B1 | | 9/2003 | Ismail et al. | |
| 6,697,617 | B2 | * | 2/2004 | Liebenow | 455/425 |
| 6,698,020 | B1 | | 2/2004 | Zigmond et al. | |
| 6,701,523 | B1 | | 3/2004 | Hancock et al. | |
| 6,704,929 | B1 | | 3/2004 | Ozer et al. | |
| 6,757,534 | B2 | * | 6/2004 | Bach et al. | 455/417 |
| 6,769,128 | B1 | | 7/2004 | Knee et al. | |
| 6,777,828 | B1 | | 8/2004 | Rothstein | |
| 6,785,901 | B1 | | 8/2004 | Horiwitz et al. | |
| 6,889,207 | B2 | | 5/2005 | Slemmer et al. | |
| 6,891,955 | B1 | | 5/2005 | Bowden et al. | |
| 6,898,762 | B2 | | 5/2005 | Ellis et al. | |
| 6,922,843 | B1 | | 7/2005 | Herrington et al. | |
| 2002/0002706 | A1 | | 1/2002 | Sprunk | |
| 2002/0095673 | A1 | | 7/2002 | Leung et al. | |
| 2002/0171763 | A1 | | 11/2002 | Stecyk | |
| 2002/0174270 | A1 | | 11/2002 | Stecyk | |
| 2002/0174430 | A1 | | 11/2002 | Ellis et al. | |
| 2002/0181933 | A1 | | 12/2002 | Ellis et al. | |
| 2003/0009758 | A1 | | 1/2003 | Townsend et al. | |
| 2003/0066075 | A1 | | 4/2003 | Bahn et al. | |
| 2003/0070166 | A1 | | 4/2003 | Johnson | |
| 2003/0079227 | A1 | | 4/2003 | Knowles et al. | |
| 2003/0103627 | A1 | | 6/2003 | Nierzwick et al. | |
| 2003/0110488 | A1 | | 6/2003 | Lee | |
| 2003/0115592 | A1 | | 6/2003 | Johnson | |
| 2003/0145321 | A1 | | 7/2003 | Bates | |
| 2003/0163811 | A1 | | 8/2003 | Luehrs | |
| 2003/0172377 | A1 | | 9/2003 | Johnson | |
| 2003/0237093 | A1 | | 12/2003 | Marsh | |
| 2004/0019902 | A1 | | 1/2004 | Knudson | |
| 2004/0019903 | A1 | | 1/2004 | Knudson | |
| 2004/0040034 | A1 | | 2/2004 | Sullivan | |
| 2004/0073927 | A1 | | 4/2004 | Knudson | |
| 2004/0083489 | A1 | | 4/2004 | Bansal et al. | |
| 2004/0123135 | A1 | | 6/2004 | Goddard | |
| 2004/0153385 | A1 | | 8/2004 | Allibhoy et al. | |
| 2004/0261097 | A1 | | 12/2004 | Hanks | |

FOREIGN PATENT DOCUMENTS

| | | | |
|---|---|---|---|
| EP | 1213919 | | 6/2002 |
| GB | 2362546 | * | 11/2001 |
| JP | 61-283228 | | 12/1986 |
| WO | WO 02/37822 A1 | | 11/2000 |
| WO | WO 01/06786 | | 1/2001 |
| WO | WO 01/17209 | | 3/2001 |
| WO | WO 01/88937 A1 | | 11/2001 |

* cited by examiner

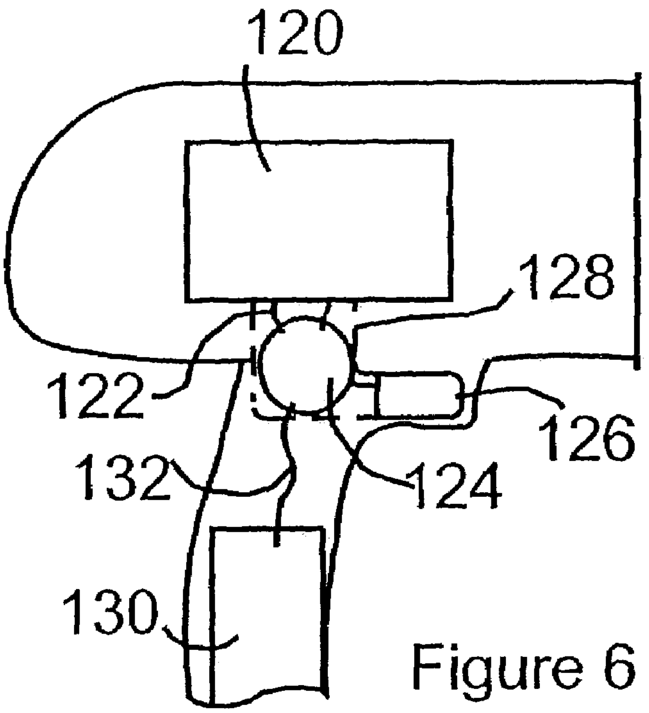
Figure 6
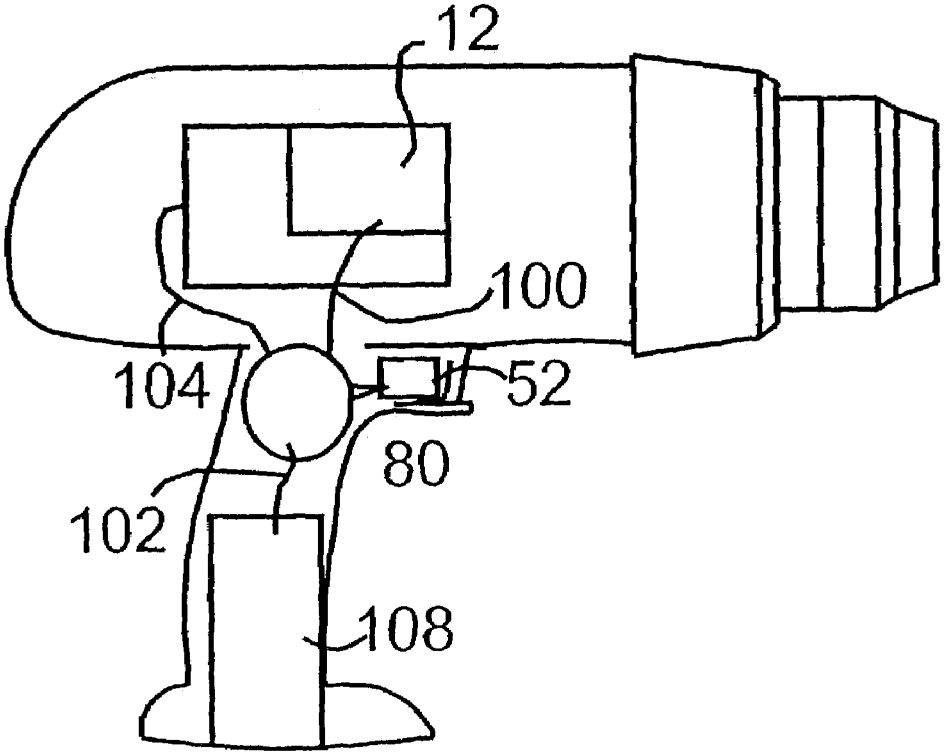
Fiaure 5

LOCKING DEVICE FOR ELECTRONIC EQUIPMENT

CROSS REFERENCE TO RELATED APPLICATIONS

This application is a continuation in part of application Ser. No. 10/273,819 filed on Oct. 18, 2002 now abandoned, which is a continuation in part of U.S. application Ser. No. 09/178,837, filed on Oct. 26, 1998, now U.S. Pat. No. 6,469,615 issued on Oct. 22, 2002 which is a continuation in part of provisional application Ser. No. 60/065,941 filed on Oct. 27, 1997 the contents of all are incorporated herein as though recieted in full.

BACKGROUND OF THE INVENTION

1. Field of the Invention

The device relates to a safety and security device that, once activated, allows the electronic equipment to run for a preprogrammed period. In some embodiments, the device is used as an antitheft device as without the code use of the device is prohibited, preventing theft and resale of protected equipment.

2. Brief Description of the Prior Art

Electronic devices offer a temptation to thieves, as they are easy to resell due to lack of distinctive features. Although people will mark their electronic devices, such as cell phones, computers, etc., unless the stolen device is resold through a legitimate vendor, there is no hope for recovery.

SUMMARY OF THE INVENTION

A locking device disclosed is for use on electronics, such as computers, cameras, cell phones, VCRs, DVDs, etc. and mechanical equipment, tools, heavy equipment and machinery, gas-powered vehicles, as well as various other wheeled vehicles. The device provides the option of permitting the equipment to be operarable or inoperable for a predetermined period of time, selection of specific operable features or being completely shut down with operation permitted only through code entry.

Electronic circuitry within the device, in conjunction with an unlocking and timer operation, requires that the equipment be unlocked prior to use. A time period for operation can be programmed into the equipment, after which time the unit shuts off or, conversely, the equipment can be shut down for a specific time period and automatically reactivitated. This reduces theft as well as preventing unauthorized use of the item.

The operating control system is for use with equipment, generally having an exterior case, a power source, an input device, at least one activation/deactivation member, and a control member. The control member, such as a separate chip or programming embedded into existing chips, either has it's own input device to enable the input of user access codes or uses an input device inherent in the equipment, such as the buttons on a cell phone. In the preferred embodiments, a readout panel, such as a cell phone, computer or camera screen, is used to monitor the status of the equipment. The readout can also be an audio output. The control member is in communication with the input device, readout panel, power source, and activation/deactivation member. The control member prevents user code. The control member can also be programmed to control the internal functions of the electronic device, such as permitting the viewing of certain channels on a TV during a predetermined time, and other channels during other times. Secondary access codes permit the system to be programmed to permit activation of the device only by those containing the secondary codes. The device can also permit cell phone calls out, but not in, or vise versa, during set time periods. Any equipment having electronic components can be incorporated with the disclosed device to provide the ability to selectively determine which features are active for specific time periods. In digital equipment, such as cameras, camcorders, etc, the capabilities are increased due to the versitality of the digital technology and it should be noted that any of the capabilities disclosed herein with one digital device can be incorporated in other digital devices.

The control system includes a programmable timer to communicate with the control member thereby enabling access to the selected feature for the predetermined period of time entered at the input device. Preferably the memory within all embodiments is nonvolitile thereby preventing a loss of the selling upon loss of power. A clock member, if not already inherent in the device, can be added to track time, activate, and deactivate the timer based on user input. In cellular phones, computers, cameras, etc., the operation of the equipment is dependent upon microchips, or microprocessors, and would not require the wiring of a power tool, or other non-processor based equipment. The versitility of the locking system enables it, as disclosed in application Ser. No. 09/178,837, to be use on equipment such as hand tools, electronics or wheeled vehicles as well as cell phones, digital and non-digital cameras, etc.

BRIEF DESCRIPTION OF THE DRAWINGS

The advantages of the instant disclosure will become more apparent when read with the specification and the drawings, wherein:

FIG. 5 is a cutaway side view of the interior of the hand tool of FIG. 1;

FIG. 6 is a cutaway side view of an alternate embodiment of a hand tool utilizing the disclosed locking device;

DETAILED DESCRIPTION OF THE INVENTION

Figure 3:
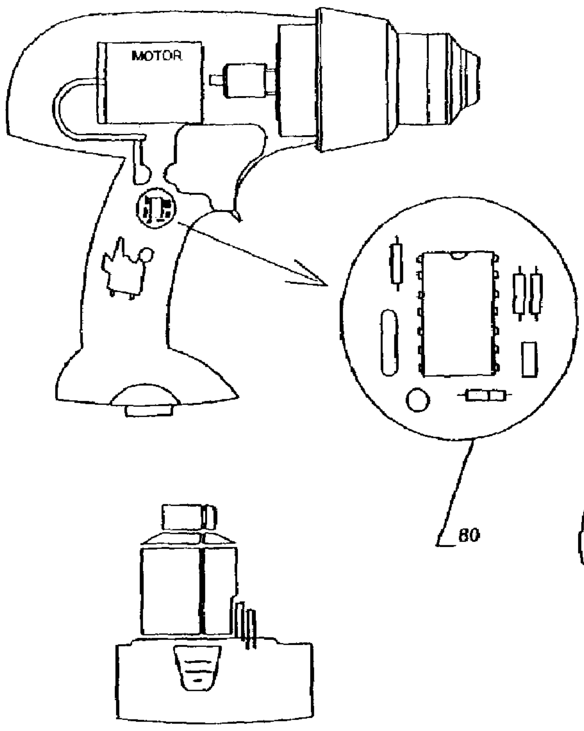
FIG. 3 is a top view of an example controller configuration.

The disclosed invention relates to a programmable device having multiple programmable features including, but not limited to, restricting accessibility to specific portions of the device and a coded locking mechanism that discourages theft and restricts or eliminates use during a predetermined time frame. In addition to the inherent advantages obtained through the locking device as disclosed, further safety advantages are achieved simply by its existence. It will be obvious to anyone who buys an item containing the locking device that unless the seller has the code, the item is most likely stolen. The disclosed locking device controls the activation of the item, preventing activation without the entry of user codes. Without access to the codes, the item is useless and unsaleable.

Electronic devices, such as cell phones, palm pilots and other hand held data access devices, cameras, computers, VCRs, televisions, MP3 players, etc. all fall into the category of easy theft devices with high resale value. Their use of programmable chips, however, makes these valuable devices easy to modified to incorporate the advantages of the disclosed system.

Alternatively, in devices such as VCRs and televisions, the device can be a separately encased unit that is retrofitted into the power source, such as the power cord or plug. The use of microchips, microprocessors or analog, technology, however, permits various functions to be monitored, such as scheduling service, based on use time or the number of hours an item has been used.

The locking mechanism is preferably of a type that does not require the use of a key, or other device, thereby avoiding an additional item to lose or carry. Access through keypads or other locking means can be used, such as magnetic card readers, fingerprint or retinal recognition, standard keys, telephone signals, or any applicable wireless technology, etc. The method of programming the device is dependent upon the type of device, size, etc. For example, touch key scanning, or other method of transmission having static data, can easily be incorporated into the device, thereby permitting data relating to the item to be tracked.

The disclosed technology provides benefits in a laboratory or other setting where equipment is centralized and removed for use. Each employee would have a personalized touch key, or other wireless or non-wireless access means, that would record the employee name, time of activation, and any other information required by the employer. In instances where security or training levels are required to use a device, the personalized access device can also carry the ID code enabling use of the device, thus preventing use by unauthorized personnel.

When the device cannot be programmed using systems inherent for the use of the device, such as a digital camera or cell phone, alternative programming "keys" containing static data, such as a touch key, can be used. The disclosed technology provides the advantage that an employer, or parent, can program the touch key with the pertinent data, including activation time, and that data cannot be changed except by someone with top level programming rights. This is advantageous when using equipment that must be shut down after a specific period of use as the preprogrammed time relieves the user from the responsibility of watching a clock. Although shut down could also be obtained through other methods, the disclosed system provides the additional advantages as set forth herein, thereby consolidating systems.

When installed on a computer, the disclosed device can be connected directly to the power supply or programmed into the chip, hard drive or other storage/memory device; permitting businesses that sell computer time to automatically shut down the computer unless additional time is purchased. In home use, the device permits parental control on the amount of time, or specific time periods, the computer, or other electronic device such as a TV, can be used by a child. Thus, the computer, VCR or TV could only be activated after homework time is over, etc. Computers are especially adaptable to keyboard programming of the device, although a keyboard interface can be included with any of the locking devices disclosed. A program embedded in the device's microchip and/or harddrive can allow for a simple timer setting that is activated through key input on the keyboard. As an option, a direct coding key can be incorporated on the keyboard that automatically accesses the program and permits activation, setting changes, etc. Although computer lock out programs are known in the prior art, they totally lock out use of the computer in an all or nothing method. The disclosed device permits access to the computer for a predetermined period of time either at random or within a specific schedule time, optionally, to extend the amount of time to use the device without interruption. For example, the system can be set to enable the computer to be turned at a predetermined time, used for a specific time period, after which the computer cannot be used until the preprogrammed activation time. This enables a parent to leave the house after programming the computer, or other electronic device or equipment, to activate at 6 pm until 10 pm after which it deactivates until the follow day at 6 pm or in reponse with other programming. The user entering the time restraints would set up the program with a user code to prevent unauthorized changes to the program.

One of the programmable modes disclosed herein is a partial activation mode, as described in detail hereinafter with relationship to cell phones. Using this mode, the user can restrict partial use of the electronic equipment, for example a computer can be programmed to restrict certain programs, such as web access, instant messages, email, specific websites or type of site, during specific blackout time periods. For example, children could be prevented from surfing the web except during specific time periods. Or computer games could only be accessed for a restricted time, however the computer could be used for word processing or other homework related activities. This mode enables the computer to be used, but in a restricted manner, based upon primary user programming. Additionally, sub-user ID's can be used to permit individual access to an electronic device. This is advantageous with children having different age restrictions by permitting the older children to access programs, make long distance calls, etc., that are unavailable to younger children.

The disclosed locking device is also advantageous for rental equipment, such as generators, compressors, VCR's, etc., in that the rented equipment can be programmed for a specific period of time and after that point be automatically deactivated. This discourages the theft of rental equipment, thereby reducing insurance and liability, since by preventing unauthorized use, especially when used in conjunction with larger equipment, insurance rates would potentially be reduced.

In electronic equipment, such as TVs, VCRs, etc. containing infrared remote controllers, the timing activation device can be activated through the remote controller. Once activated the program would appear on the screen and utilize either existing or specific keys to set the shut down time, user time periods, or extend the time period, etc. This would be an inexpensive addition to a controller and increase user convenience. Alternatively, the controller itself can be used to set the time of use, without the appearance of the setting program on the screen.

It should be noted that the use of analogue, key scanners, infrared, fingerprint or retinal recognition, etc. taught herein for use by a specific embodiment, is not limited to that embodiment. Each embodiment of the locking device disclosed herein can incorporate the electronics, memory, etc. as described herein in relation to any other embodiment.

Figure 1:
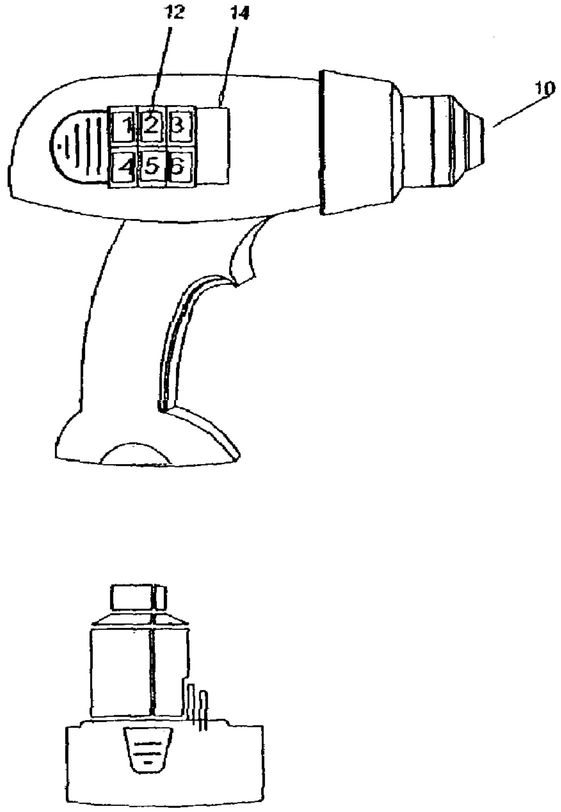
FIG. 1 is a side view of an example hand tool incorporating the locking device.
Figure 2:
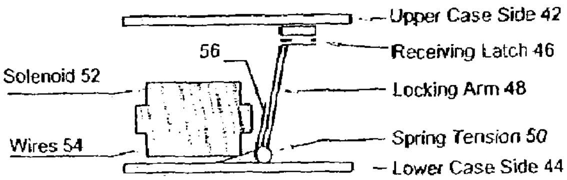
FIG. 2 is a cutaway view of the interior of the locking arm and solenoid of the instant invention.

A hand drill, as illustrated in FIGS. 1 and 2, is used to illustrate the disclosed mechanism used to limit user time, however this is as an example only and is not intended to limit the invention. The power tool 10 is illustrated in FIG. 1 ready for use, incorporating a numeric keypad 12 as the locking mechanism and other activating mechanisms will be apparent to those skilled in the art.

The time can be set through any means appropriate to the equipment being used as well as the final use. For example, the time can be through repeatedly touching a specific key, jumping the time by predetermined increments. Alternatively, an "enter" key can be provided which allows entry of the unlocking code and subsequent entry of a predetermined period of time. Preferably, all timed locking devices are provided with nonvolatile memory to prevent the loss of programmed instructions in the event the item's battery goes dead or is removed. This is more critical with rechargeable hand tools where completely discharging the battery is sometimes required to fully recharge.

The incorporation of a microchip to register the locking codes and program the activation time further provides the added ability to monitor various other tool functions. For example, an LED display 14 of FIG. 1 can be included which indicates the activation time remaining and, if desired, the current status of the tool. The status can include, for example, current battery power (both during recharge and discharge), pressure remaining when air tools are used, rpm and direction of drills, etc. This is of optimum use in monitoring the status of rechargeable batteries. Since many rechargeable batteries do not either fully charge unless fully discharged prior to recharging, the battery-monitoring device permits optimum use and management of the battery. It should also be noted that an LED could be provided on the recharging device to monitor the battery recharge thereby serving as a double check to the LED on the device being charged.

Figure 4:
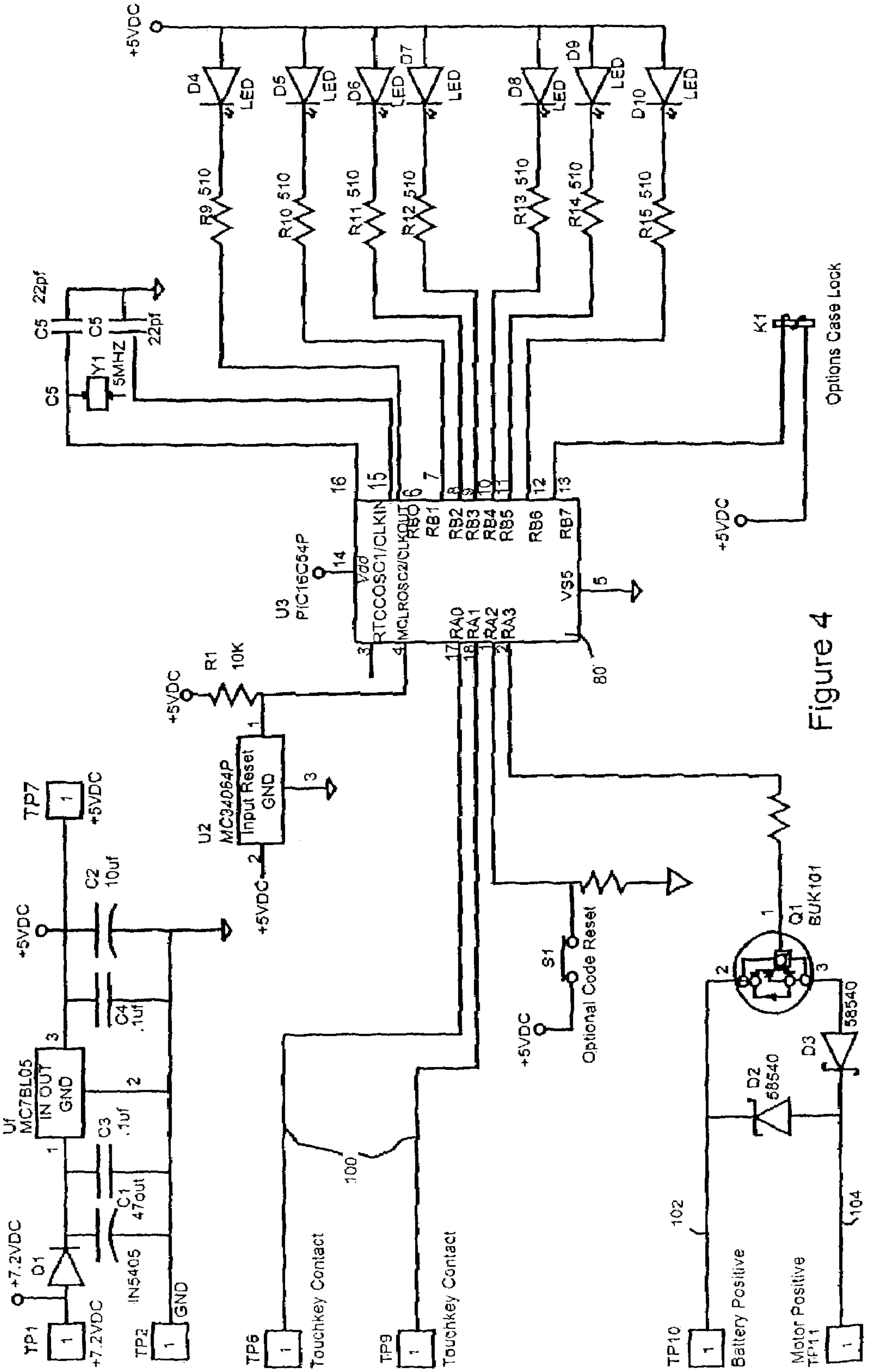
FIG. 4 is the schematic of an example wiring for the locking device for use with a hand tool.

In FIG. 2, one design of the internal activation unit 40 is illustrated. The locking arm 48 is supported between the upper case side 42 and the lower case side 44. The spring tension 50 is designed to place the solenoid contact 56 in physical contact with the solenoid 52 when the locking arm 48 is pulled back during use. Once the locking arm 48 is released, the solenoid contact 56 is removed from contact with the solenoid 52. The solenoid 52 receives power from the battery 108 (FIG. 5) through the controller 80, an example of which is illustrated in more detail in FIG. 3. As can be seen from the example schematic of FIG. 4, the controller 80 serves as the central processing area, with all input and output passing through the controller 80. The controller 80 is connected directly to the locking mechanism, such as a numeric keypad 12, through the keypad wiring 100. The battery wiring 102 and motor wiring 104 also feed into the controller 80. Once the locking means, such as numeric keypad 12, is activated, all connections are made and power is free to go to the driver specific to the power tool 10. The exact schematic of the wiring is not critical, as the criticality lies with in the interaction between the locking means and the controller 80. The interior of the hand tool 10, as shown in FIG. 5, is traditionally spaced, with the controller 80 located within the handle area. In this embodiment, the various connecting wires 100, 102 and 104 are exposed and, in the event of theft, the case can be opened and the wires cut and crossed to bypass the controller 80. In order to prevent a thief from opening the case and by passing the controller 80, the case is provided with a safety lock key having a number of different embodiments. One embodiment is to incorporate a locking member, wired to the control through the locking wire 156, that is deactivated by a locking code, key or other compatible methods. The controller 80 can be programmed to allow the case to release, for example through a separate code being entered or by holding down the last number of the existing code for a predetermined time period. A separate code is preferable in that it prevents any unauthorized access to the interior of the case.

In an alternative embodiment to the safety lock key, the solenoid 126 and wiring 122 are encased in an epoxy, indicated herein as region 128, as illustrated in FIG. 6. By encasing the wiring 122 within the epoxy, it is impossible to rewire the unit and bypass the controller 124. Other materials, known in the art, can be used to replace the epoxy. To facilitate the placement of the epoxy region 128, the wiring 122 from the motor 120 exits the motor casing proximate the controller 124, which has been placed as close as possible to the solenoid 126. This revised placement reduces the area to be protected, thereby reducing material and labor costs. Revising the placement of the battery 130 is difficult, preventing in some instances the battery wiring 132 from being covered. However, with the controller 124 and solenoid 126 both encased in epoxy, there would be no value to cutting the battery wire 132, as there would not be any accessible power connections.

Figure 7:
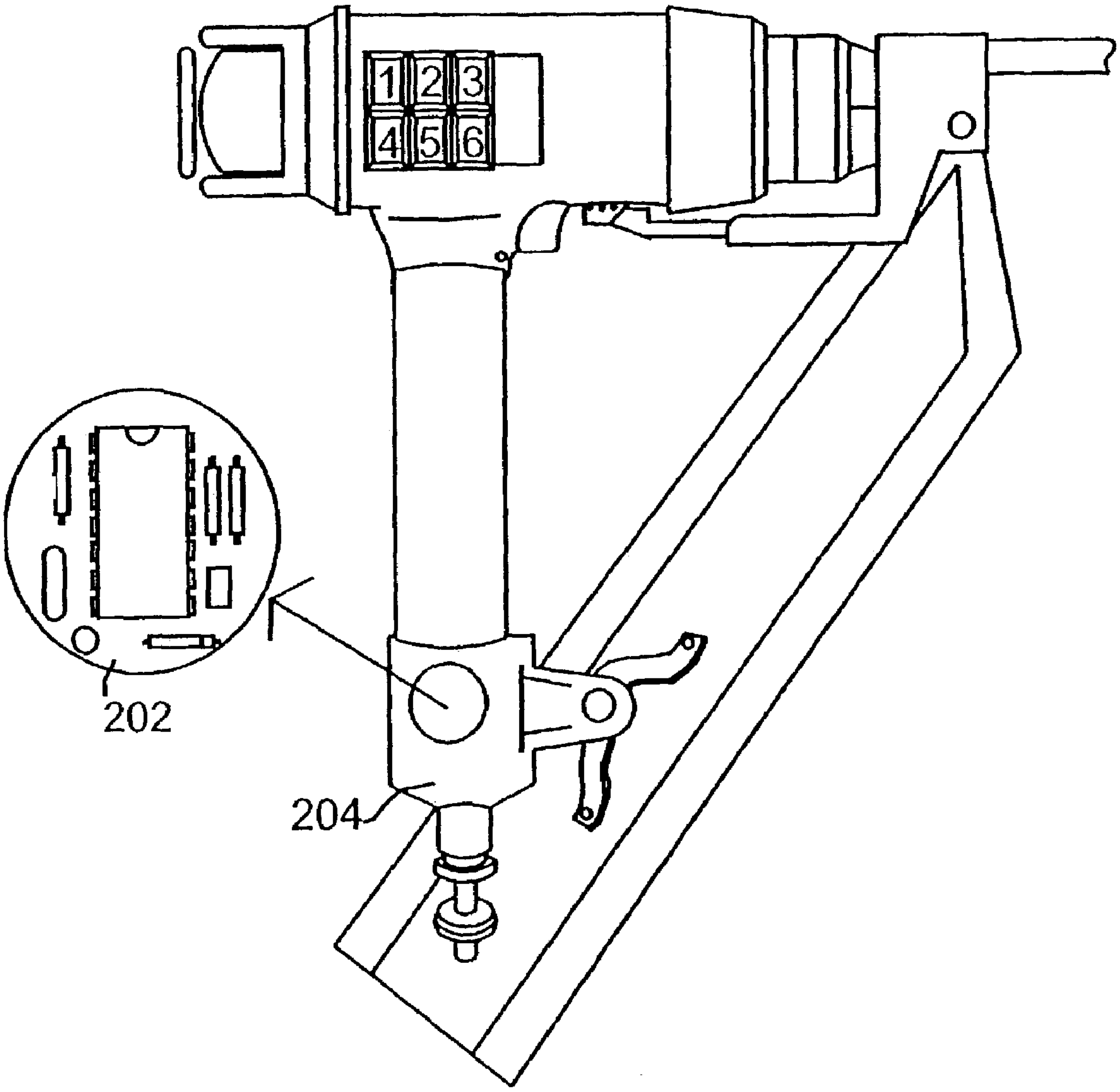
FIG. 7 is a side view of the instant device for use with a air tool system.
Figure 8:
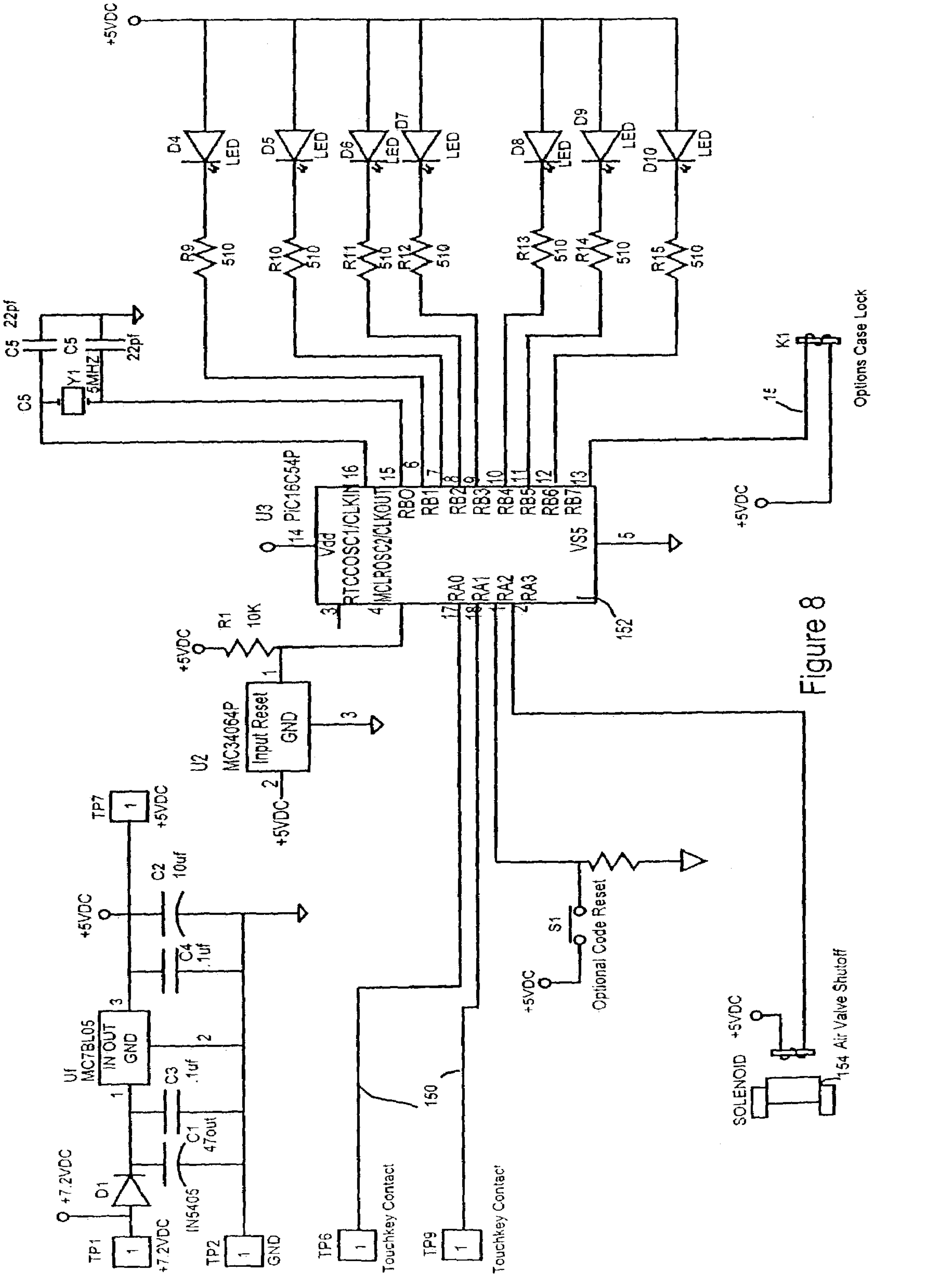
FIG. 8 is a schematic of the wiring for use with the locking device used in conjunction with air tools.

In FIG. 7, the locking device is illustrated being used with an air tool 200, although it should be noted that the device can also be used with propane, gas, and diesel tools and equipment. The controller unit 202, as illustrated, is located in the handle 204 of the air tool. As can be seen in the example schematics of FIG. 4 (battery) and FIG. 8 (air tool) there is little difference in wiring between the two. As stated, in the schematic of FIG. 4 the touch key-wiring 100 goes to the controller 80, as does the battery wire 102 and the motor wire 104. In the air tool, or other removed power source, the touch key wiring 150 and solenoid 154 wiring feed into the controller 152 and onto the driver, the battery and motor connections being eliminated.

As stated heretofore, the disclosed device can be easily incorporated with electronic equipment. The programming of the equipment can be through a number of methods and additional methods will become evident as technology changes and will be evident to those skilled in the art.

Rewrite swipe cards are gaining popularity and can easily be incorporated with the disclosed device. The cards can be rewritten with the new codes using a computer or other applicable device, such as a palm or remote control. For example, a computer program can contain the applicable coding for all the electronic devices which incorporate the disclosed technology. A user can select the functions to be incorporated for each device and write them to the card. The user can then use the same swipe the card to program each of the electronic devices available as each device will recognize its codes and ignore programming for other devices. Alternatively, a small hard drive, such as used in digital cameras, can be used to program the various electronic devices.

The schematic of FIG. 15 is an example of the electronics for a device being incorporated into a computer, VCR, television, etc. As can be seen, the basic functioning of the anti-theft device is the same as used for a battery operated, air or electric tools or other devices. As in the schematics disclosed heretofore, the touch key wiring 302 feeds into the controller 304. In this embodiment, however, the electric wiring 306 is connected to the controller 304 through the latching relay wires 308. The schematic of FIG. 16 provides an example of the electronic layout, disclosed in FIG. 15, to incorporate the analogue function into the device through analog wiring 350.

As stated heretofore, cellular phones are a small sized, high dollar theft item that is difficult to protect. Most people leave their phones on all of the time so that the implementation of an on/off-activated lock would not prevent theft; as the phone would most likely be turned on when stolen and a thief would simply leave the phone on. Incorporating the disclosed system, the thief would know that there was no way to stop the phone from shutting down at a pre-designated time and that once the predesignated time had expired the phone would be unusable. Using the disclosed system, the user could program the phone to shut off permanently at the expiration of a predetermined time or, alternatively at a preset time. For example, this would enable the user to tell the system that it should shut off at 9:00 p.m., or alternatively once the timer reach three hours from the programming time. Once shut down, the device would require reentry of the access codes. The disclosed system further enables a user to set the phone to shut down for a predetermined period of time, with automatic reactivation at the end of the time period.

The ability to turn the phone off for a predetermined period of time, after which it automatically reactivates for a predetermined time based upon user programming, is beneficial for people attending meetings, movies, or some other activity that requires the phone to be turned off. Since the phone will automatically reactivate, the user does not need to worry about turning the phone back on. In the preferred embodiment, the phone can also be set to either receive calls or make calls, during a user programmed time period, as well as the standard incoming/outgoing mode. Thus, if the phone is being loaned out and the owner of the phone does not want his/her calls to be picked up by anyone else, the phone can be set to forward all of the phone owner's incoming calls to their voice mail or other call forwarded location, while still allowing the person having the phone to make outbound calls. In the reverse mode, the person having the phone can receive calls, but cannot use the phone to call out.

It should be noted that for maximum security, the code enabling the programming disclosed herein is preferably on the phone's, or other equipment's, permanent memory device, such as hard drive, microchip, etc. and is not solely dependent upon any temporary software, phone card or other removable system.

A delayed activation can also be programmed into any of the devices to enable activation at a specific time or after a certain amount of time has lapsed. Thus, in applications such as the electric tools used on a construction site, the foreman can program the tool to activate in thirty minutes and to stay activated for an additional eight hours.

In any electronic device the commands can be set through a variety of methods. On equipment that has a built in a screen, such as a digital camera or cell phone, the screen can be used to monitor the exiting settings and program new settings. In devices without screens an external LED display, voice activation, or some other means of forming communicating between the device and the user can be incorporated. The existing command or program buttons can be used to program the device or additional buttons can be incorporated into the design at the time of manufacture. Additionally, remotes, infrared, Bluetooth, or other wired or wireless devices can be used as a programming tool.

Figure 11:
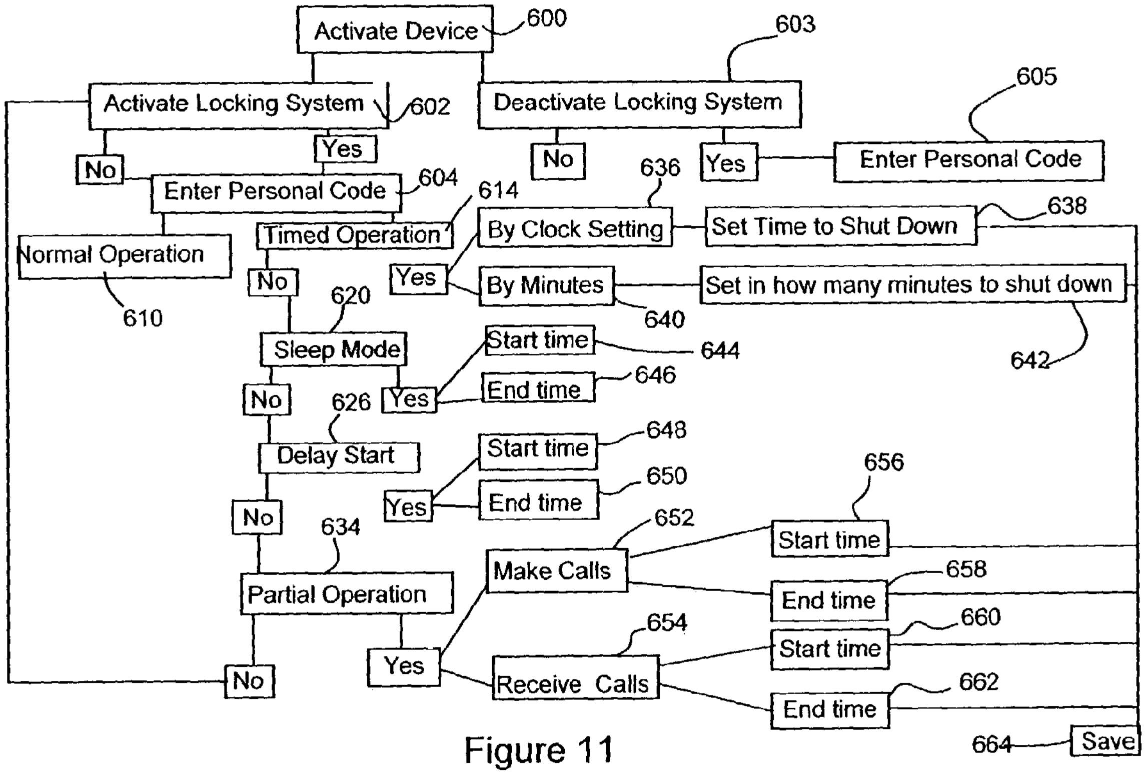
FIG. 11 is a flow chart for programming a multi-operation device.

A sample of a sequence for the user to follow when programming a cell phone is illustrated in FIG. 11. Once the device is activated 600 the system inquires whether the user would like to activate the locking system 602 or, no changes are to be made entering the use mode 603.

Use Mode

If the user chooses to simply use the system 603 or 701, they simply enter the personal code 605 or 703 and the system returns to the previous program or the standard operation for a time period set by the manufacturer. If the user chooses to alter the previous program, the user has either changed their mind or made the incorrect selection, they indicate "no", the programmed modes remain as currently set and the option to go the program mode would be offered. It should be noted that the safety issues disclosed herein would be negated if the user was able to simply turn off the locking system. In the preferred embodiment the manufacturer sets a default maximum amount of time that the phone can be continuously activated, after which it automatically shuts down. This maximum operational period is preferably applicable not only to cell phones but all devices using the disclosed locking system. The maximum time can be set by the user using a separate code, either single or multiple use, from the standard programming.

Figure 12:
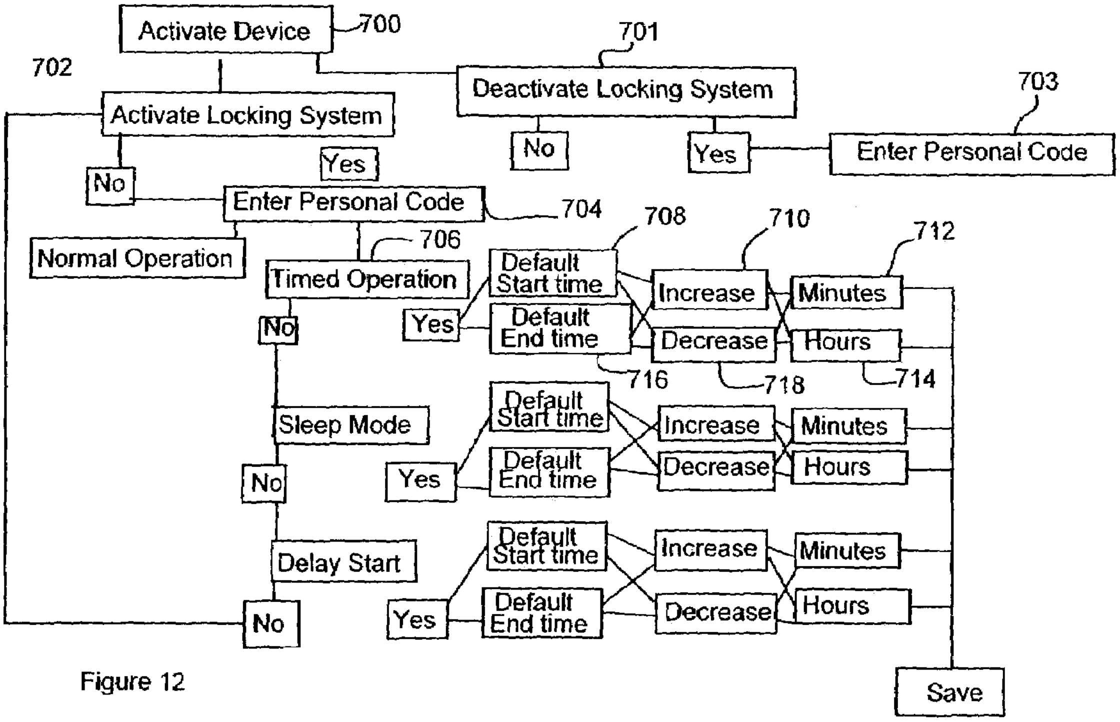
FIG. 12 is a flow chart for programming a single operation device.
Figure 13:
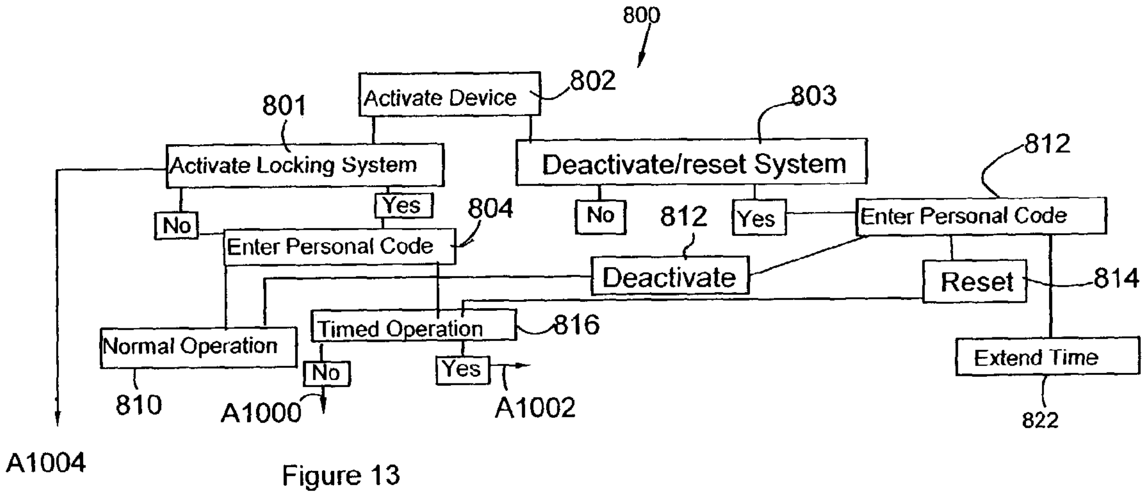
FIG. 13 is a flow chart for programming an electronic device including a reset option.

In FIG. 13, the additional option of resetting the system is added, enabling the user to either deactivate or reset the system 803. If the system is deactivated, the user enters their personal code 812 and selects whether they wish to deactivate 812 or reset 814. If deactivate 812 is selected the system enters normal operation 810, again incorporating the preferred restriction of a maximum operating time. If the user selects to reset 814 the system then goes to the timed operation sequence 816, the system continues following arrows A1000 and A1002, following the sequence as set forth in FIGS. 11 and 12. It should be noted that arrow A1004 serves as the return from the "no" selection at the end of the programmable options.

It should be noted that the term fall back as used herein can relate to either the default set by the manufacturer or the last programmed codes. The fall back preference is set at the initial programming by the user at the time of set up.

Program Mode

If user answers "yes" to the Program Mode 602, or activate the system, as illustrated in FIGS. 11 and 12, asks if the user if they wish to program, proceeds requests the personal code 604 and then, if the code is correct, either enters into the programming selections 706 or enters fall back operation 610, again for the maximum operational period. This permits either the previously set parameters to be repeated until a change in programming is required or the factory set default mode entered. If, however, the user answers "yes", the system requests the personal code be entered 604 and, if correct, the user is then presented with several modes from which to select. These modes can be viewed by scrolling or, depending upon the size of the screen, all displayed with the arrow keys enabling selection. It should be noted that the sequence discussed herein in respect to this Figure is not intended to limit the invention in any way and different sequencing, alternative actions, etc. can be incorporated.

The Timed Operation mode, or scheduling 614, provides the user the ability to shut down the operation of the device by clock setting 636 or number of minutes 640. In the event the clock setting 636 is selected, the user then enters the time of day that the device shuts down 638. If the minutes 640 module is selected, the number of minutes prior to shutting down is requested 642. Preferably, a preset maximum time of operation will still prevail after which the user code would be required to reactivate the phone. The selection of "no" as a response brings up the sleep mode 620 operation which, if entered through, enables the user to set a start time 644 and an end time 646 during which the device is inoperable. "No"

again bypasses the sleep mode 620 to the delay start 626 mode which enables the user to set the commencement of the start time 648 at a time later than the time of entry. The end time 650 is similar to the sleep mode end time 646. The partial operation mode 634 enables the user to separate the ability to make calls 652 from the ability to receive calls 654. When the make calls 652 operation is selected, the user enters the start time 656 and the end time 658 during which calls can be made. The receive calls 654 also permits start time 660 and end time 662 entry. In the event the user selects none of the modules the system returns to the activate locking system mode 604.

Depending upon the end cost, the device can be programmed to accept multiple different commands, such as a sleep mode 620 where it does not operate from the start time 644 to the end time 646 and timed operation 614 in which the device shuts down 638 at 8:00 pm.

Extend Time

The devices can be provided with an extend time mode 822, as illustrated in FIG. 20, and it should be noted that although the devices can be provided with this mode, as noted heretofore, it cannot permit endless extended time as that would eliminate the security concept. In this embodiment, the user activates the device 802, selects to activate/reset the system 803 and enters the personal code 812, the option of extend time 822 is presented. In the extend time option 822, the user can extend the time of the current programming equal to, or less than, the original program period. The amount of time for extension can be determined by the manufacturer and would be unchangeable by the user. For example, the phone can either shut down upon expiration of a preprogrammed maximum operational period or after a preset number of extensions 822.

In FIG. 19, rather than enter a specific start time, as set forth in the prior Figure, a default time has been entered. Therefore, once the user activates the device 700, responds positively to activating the locking system 702 and enters the personal code 704. Upon selection of the timed operation mode 706, the default start time 708 is displayed, giving the user the opportunity to increase 710 or decrease 718 the time by either minutes 712 or hours 714. It should be noted that the use of minute and hours for example only and the time categories can be days, weeks, or any increment selected by the manufacturer. The default end time 716 is adjusted in the same fashion. Each of the modes in this Figure provide the default time options, however it should be noted that the default modes illustrated in FIG. 19 can be also included in conjunction with the timer setting modes illustrated in FIG. 18. Alternatively the user can be provided with the choice of whether to select the default or the timer settings.

FIG. 13 would be more applicable for cameras, TVs, computers and other devices that have only one type of operation. In other words do not have the dual operations, send and receive, as does a cell phone or a VCRs record and play. It should be noted that the system as disclosed in FIG. 13 is used in the same way as explained in FIG. 12.

Figure 14:
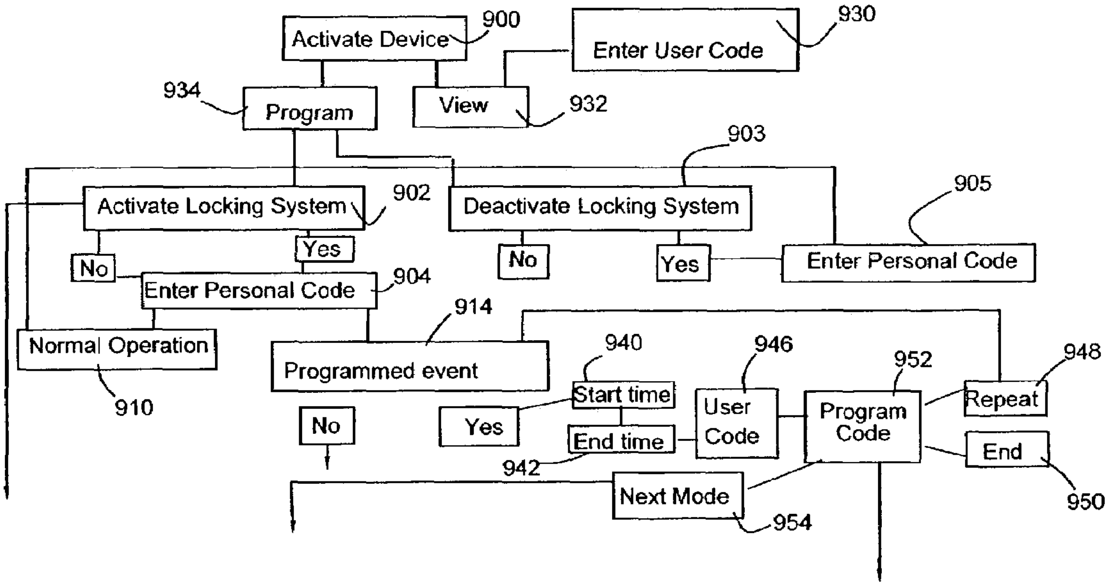
FIG. 14 is a flow chart for programming an electronic device designating specific events, times and users.

In the embodiment of FIG. 14, the user is able to schedule one or more specific events and their playing time. As used herein, an event includes computer programs, television shows, radio stations, or any other specific event that is viewed or listened to through the electronic device. For example, between 7:00 pm and bedtime, by controlling the stations that can be viewed, a 12 year old could only watch specific shows and, at bed time, the TV would no longer be accessible. To accomplish this the primary, or programming user activates the device 900, and is asked whether they are to program 934 or view 932. Entry of program 934 inquires whether the primary user would like to activate the locking system 902 or deactivate the system 903. As with the prior embodiments, if the primary user decides not to activate the system, the personal code 904 is requested and the device enters fall back operation 910, again with the maximum running period or previously programmed time. If the primary user wishes enter a programmed operation 614, they enter the start time 940, end time 942, user code 946 and the program code 952 while other programs are blocked. This tells the system that at the start time 940 the secondary, or non-programming user matching secondary user code 946 can watch the program entered into the program code 952 while other programs are blocked. To facilitate programming, multiple user codes 946 can be entered, or checked off on a list. Once the program code 952 is entered, the user can either repeat 948 the programming event 914 or end 950 the event. When returned to the programmed event 914, the user can either program another event or continue on to other modes contained on the device, such as those illustrated in FIG. 13. Alternatively, a next mode 954 can be accessed directly from the program code 952 module.

If the user wishes to view 932, the user code 930 is entered and the system permits viewing of the preprogrammed events. This system is for use predominately on TV's and computers, however other applications will be evident to those skilled in the art.

One use of the disclosed invention is in commercial industries with workers using company owned tools and equipment, computers, motel TVs and VCRs, etc. The tools, or other equipment, are activated in the morning to run for an entire shift, at which point they shut down. This prevents theft from outside sources as well as employees. Additionally by reactivating the tools each morning, a “safety check” can be incorporated with the activation to prevent faulty equipment from being used.

The locking device can further be used with bicycles, shopping carts, wheelchairs, etc. It should be noted, however, that since the locking devices disclosed herein operate on bicycles by stopping movement of the pedals, this device is not recommended for bikes, or other items that have foot brakes. In the event, that the device was activated during use, the user would be unable to activate the brakes. The example used herein is a bicycle, however the device, as disclosed, can easily be adapted for a variety of other wheeled devices. The locking device for use with bicycles, or other applicable devices, preferably has a weight of about one (1) pound or less.

Figure 9:
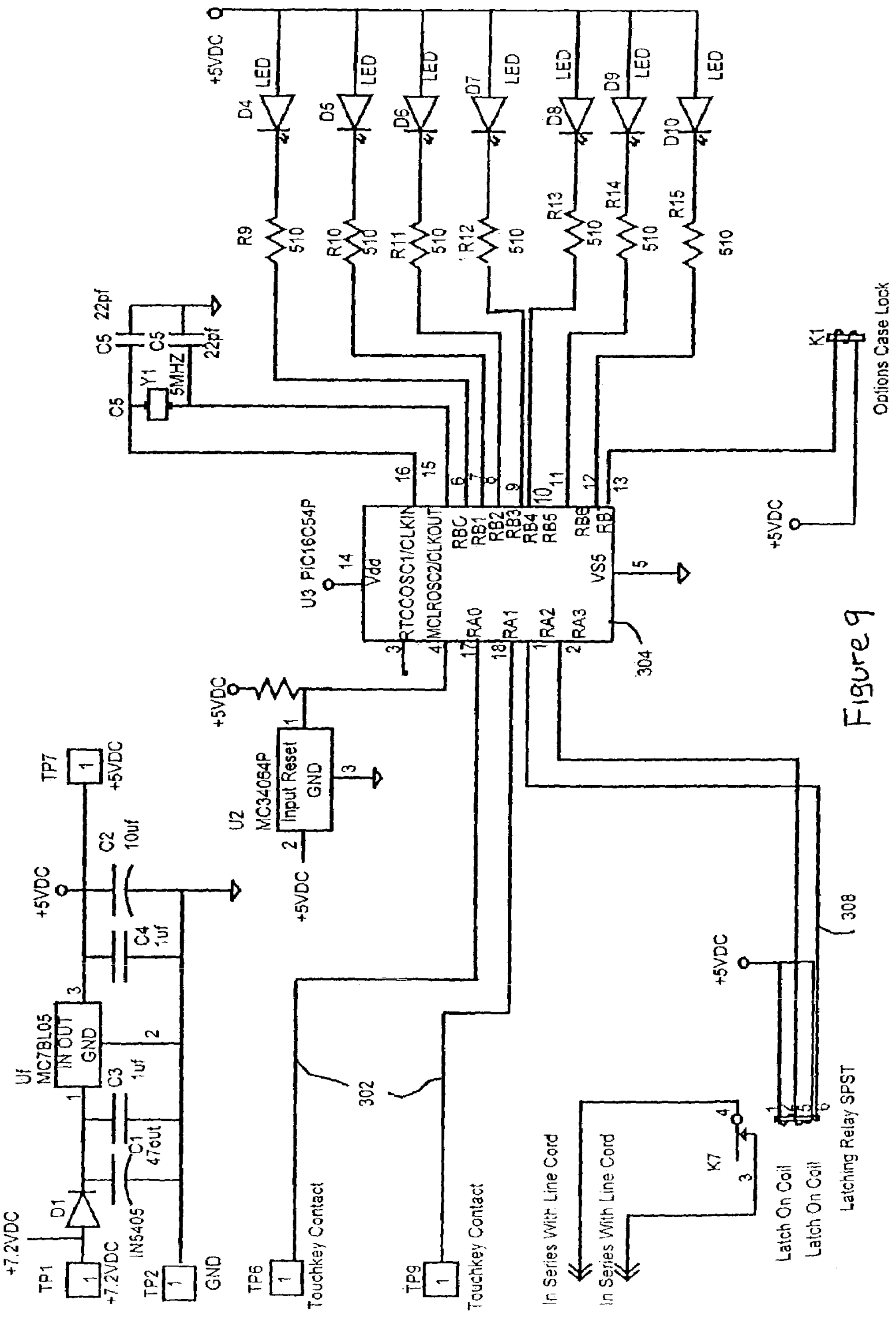
FIG. 9 is a schematic of the wiring for use with electronic devices.
Figure 10:
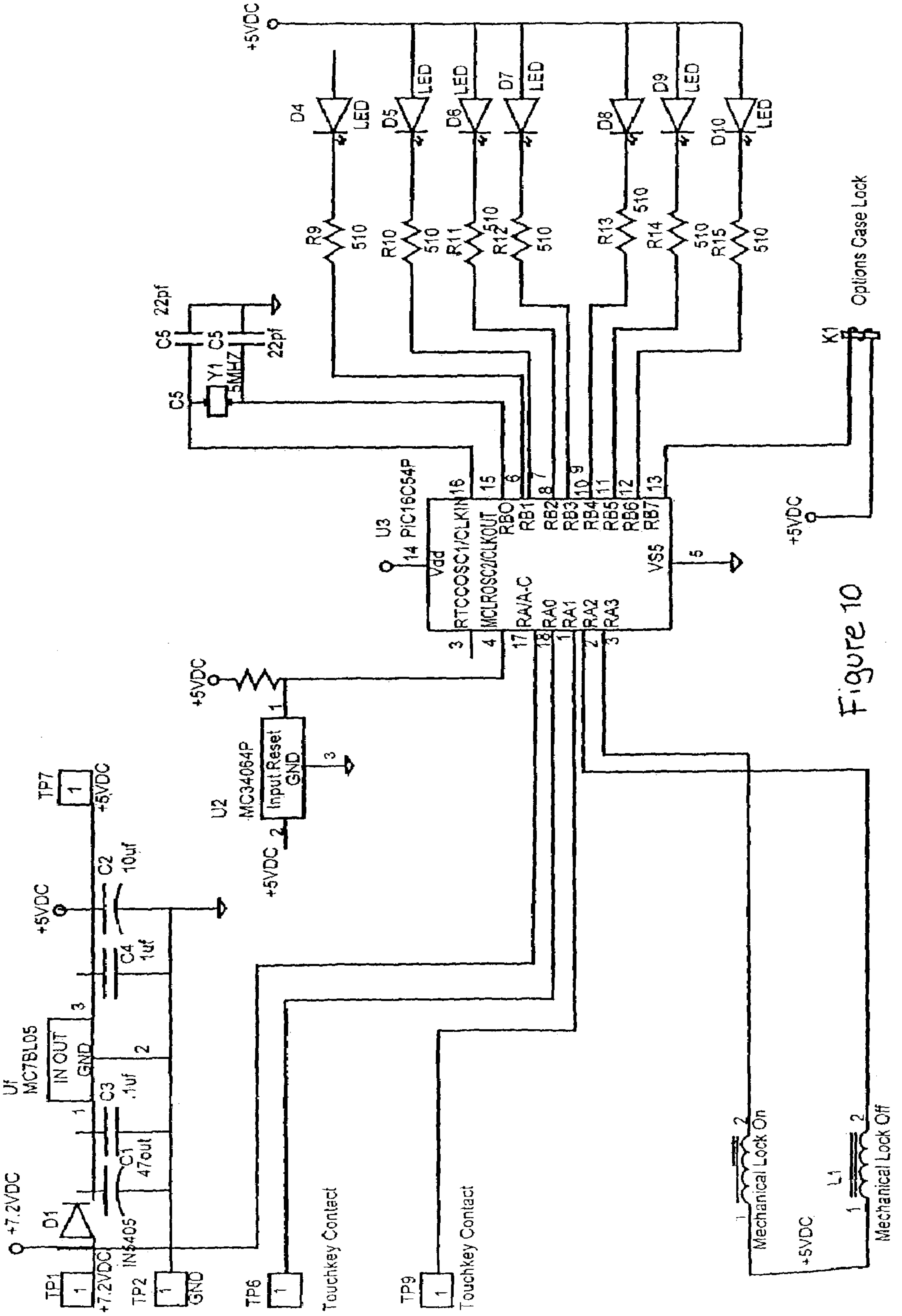
FIG. 10 is a schematic of the wiring for use with the locking device incorporating the analogue function.

FIGS. 9, 10 and 11 illustrate a manual version of the locking device 200 for use with wheeled vehicles and is illustrated on a bicycle. The locking mechanisms within the locking device are located within a protective case 202 to prevent tampering. The case 202 is welded to the front frame 230 and rear frame 232 as currently done in the art replacing the standard joint at the juncture of the front and rear supports. The case 202 is slightly larger than standard cases to accommodate the locking device 200. The pedal axle 204 passes through the case 202 and is attached to the pedals 236 as known in the art. The engagement disk 208 has a centered receiving hole 220 that permits the disk 208 to be mounted on the axle 204. The disk 208 is welded to the axle 204 to cause the disk 208 to rotate with the axle 204 as the bicycle is pedaled. The disk 208 contains a series of receiving holes 222 around its periphery. The receiving holes 222 are dimensioned to receive the locking bar 210 that has been encased in the locking brace 216. The locking brace 216 is secured to the case 202 to prevent movement of the bar 210 and therefore movement of the pedals 236 once the bar 210 is in the locked position. When in the unlocked position, the locking bar 210 is drawn into the locking brace 216. Once placed into the locked position, the bar 210 engages the receiving holes 222 of the disk 208 and prevents the pedals 236 from turning. The locking brace 216 must be securely affixed to the case 202 to prevent the brace 216 from dislodging when a user attempts to pedal during the locked mode. Additionally, the locking bar 210 must have sufficient strength to prevent the bar 210 from snapping or bending. In the embodiment of FIG. 9 the bar 210 is placed into either the locked or unlocked position by a key lock 206, or other mechanically operated device. The interior mechanisms moving the locking bar 210 in response to the key lock 206 are like those of dead bolts for doors and other methods will be known to those skilled in the art.

To provide the ability to repair the locking device in the event a problem arises; a bottom plate 214 is incorporated into the locking device 200. The bottom plate 214 illustrated has a rotating lock 212 that is secured to a locking plate 220. The flanges 218 extend into the open area of the case 202 and provide support for the locking plate 220 when rotated to the locked position. Rotation of the rotating lock 212 moves the locking plate 220 into a position to clear the flanges, thereby permitting removal of the bottom plate 214. The locking mechanism for the bottom plate is an example of a method for locking the bottom plate onto the case and other methods known in the art can be used.

An automatic embodiment of the locking mechanism for use with bicycles is illustrated in FIGS. 12-14. The engagement disk 308 is welded to the pedal axle 324 as described heretofore. Rather than the manual lock of FIG. 9, the interacting locking bar 326 is operated by a battery-powered solenoid 304. The solenoid 304 is maintained in position through use of a casing 306 that is securely affixed to the outer case 302. As stated heretofore, the locking bar 326 must be capable of withstanding the pressure exerted by a person attempting to pedal the bike. The batteries 340 to power the solenoid 304 can be contained within the front support 342 or other location convenient for manufacture. The use of a battery-powered solenoid also permits the use of a timer as disclosed for use with the hand tool of FIG. 1. The analogue timer is advantageous for companies renting bikes by the hour or day as the timer can be activated upon the bike being removed from the shop and the time read and calculated upon return. The timer readout, entry method, etc., can be incorporated in either the front support 342 or back support 344.

The base plate 312 uses an alternate design to the embodiment of FIG. 9. In this embodiment, the base plate 312 is provided with a key lock 314 that is attached to dual rotating bars 320 and 322. The sides of the case 302 are provided with flange pairs 318 and 316 that are dimensioned to interact with the rotating bars 320 and 322. Thus, as the key lock 314 is turned, the bars 320 and 322 move out of their interaction with the flange pairs 318 and 316, thereby releasing the base plate 312.

Since other modifications and changes varied to fit particular operating requirements and environments will be apparent to those skilled in the art, the invention is not considered limited to the example chosen for the purposes of disclosure, and covers all changes and modifications that do not constitute departures from the true spirit and scope of this invention.

What is claimed is:

1. An operating control system for cell phones, said control system being internal to said cell phone and having:

a. an activation/deactivation member;

b. at least three user programmable modes;

c. at least two user access codes, at least one of said at least two user access codes being a primary user code to program parameters by said primary user for each said at least three user programmable modes and at least one other of said at least two user access codes being a secondary code that enables secondary user access only to said at least three user programmable modes based upon said program parameters, programmed by said primary user code;

d. a primary user programmable mode selection member, said primary user programmable mode selection member enabling said at least three user programmable modes to be selected and programmed by a primary user for user by each of said at least one secondary user;

e. multiple user programmable activation periods, each of said multiple user programmable activation periods being programmablyset by a user for each of said at least three user programmable modes;

f. an activate programming mode, said activate programming mode accessible with said primary user access code for programming said parameters, including activation period, for said at least three programmable modes;

g. input means, said input means to receive said user access codes, said programmable mode selection and said programmable mode activation period;

h. an internal control member, said control member being in direct communication with said input means, said programmable feature activation period and said programmable feature selection member;

i. a use mode, said use mode being activated by entry of said secondary code and enables use by a secondary user of said multiple user programmable modes based upon said parameters;

wherein said internal control member controls operation of said cell phone based upon said parameters in said at least three user programmable modes for each of said multiple user access codes.

2. The control system of claim 1 wherein said at least three user programmable modes include, normal operation and at least one member from the group of sleep mode, delayed start, at least one extension mode, selective number blocking, and partial operation, each of said at least three programmable modes being operable for a user programmed period.

3. The control system of claim 2 wherein said at least one member is partial operation and said partial operation includes making outbound calls and blocking inbound calls.

4. The control system of claim 2 wherein said partial operation includes receiving inbound calls and blocking outbound calls.

5. The control system of claim 2 wherein said partial operation includes programming permitted numbers for outgoing calls.

6. The control system of claim 2 wherein said partial operation includes programming permitted numbers for incoming calls.

7. The control system of claim 1 wherein at least one of said user access codes, selection of said at least three programmable modes and programming of said programmable mode activation periods, are programmed into said electronic equipment by a removable member.

8. The control system of claim 1 wherein said at least one extension mode extends the current activation period by a preprogrammed period.

9. The control system of claim 8 further comprising a maximum operation period, said maximum operation period being the activation period plus a maximum number of said at least one extension mode periods that can be sequentially activated.

10. The control system of claim 9 wherein said maximum operation period is changeable only by means of said primary user access code.

11. The control system of claim 1 wherein said user selecting normal operation returns said electronic equipment to the previously activated sequence for the remainder of said activation period.

12. The control system of claim 8 wherein the length of said at least one extension mode is changeable only by means of said primary user access code.

13. The control system of claim 1 wherein said at least three user programmable modes include normal operation and at least one member from the group of sleep mode, delayed start, at least one extension mode, selective number blocking, and partial operation, each of said programmable modes being operable for a time period programmed by said primary code.

14. The control system of claim 1, further comprising a remote member, said remote member programming into said cell phone said at least two user access codes, selection of said at least three programmable modes, and programming of said multiple programmable activation periods.

15. The control system of claim 1 wherein said user is notified that a said activation period will be terminating.

16. An internal operating control system for a cell phone, said control system having:

at least one primary user access code, said at least one user programmable primary user access code having use rights and programming rights, said programming enabling said primary user code to program parameters for at least three user programmable modes;

at least one user programmable secondary user access code, each of said at least one secondary user access code enabling use only of said at least three user programmable modes programmed for each of said at least one secondary user access code based upon said parameters;

a programmable mode selection member, said programmable mode selection member enabling said parameters for each of said at least three user programmable modes to be programmed by said primary user, said at least three user programmable modes being selected from the group of:

activation period said activation period being the programmed use period;

normal operation, said normal operation causing the previously set parameters to be repeated;

sleep mode, said sleep mode preventing operation of said equipment for a user selected period, returning to operation at the expiration of said user selected period;

delayed start, said delayed start preventing operation until a user set period; and partial operation, said partial operation enabling a primary user to select one or more functions of said cell phone for operation and to select one or more functions of said cell phone for non operation;

multiple programmable mode activation periods, said programmable mode activation periods being set by a primary user for each of said multiple programmable modes selected;

use mode, said use mode enabling said secondary user to activate said multiple programmable modes within said parameters programmed by said primary user; and an internal control member, said control member being in direct communication with said input device, said power source, said programmable mode activation period and said programmable mode selection member;

wherein said internal control member controls operation of said cell phone by limiting programming access to said multiple programmable modes and said programmable mode activation periods for each of said at least one secondary user code, to a user having said primary user access code, and preventing programming access to one or more of said multiple programmable modes for a user having only said secondary user code.

17. The control system of claim 16 wherein said partial operation includes making outbound calls and blocking inbound calls.

18. The control system of claim 16 wherein said partial operation is operational for a preprogrammed limited period.

19. The control system of claim 16 wherein said partial operation includes receiving inbound calls and blocking outbound calls.

20. The control system of claim 19 wherein said partial operation is operational for a preprogrammed limited period.

21. The control system of claim 16 wherein said partial operation includes programming phone numbers for permitted outgoing calls.

22. The control system of claim 16 wherein said partial operation includes programming permitted phone numbers for incoming calls.

23. The control system of claim 16 further comprising at least one extension period mode, said at least one extension period mode extending said activation period by a selected preprogrammed time period.

24. The control system of claim 23 further comprising a maximum operation period, said maximum operation period being said activation period plus a maximum number of said at least one extension period mode that can be sequentially activated.

25. The control system of claim 16 wherein said activation period is unchangeable by a primary user.

26. The control system of claim 23 wherein the length of time of said at least one extension period mode is unchangeable by a primary user.

27. The control system of claim 16 wherein said user selecting normal operation returns said electronic equipment to the previously programmed sequence for the reminder of said activation period.

28. The control system of claim 16 wherein said user is notified that a said activation period will be terminating.

* * * * *